(12) United States Patent
Fujimoto

(10) Patent No.: US 7,761,335 B2
(45) Date of Patent: Jul. 20, 2010

(54) ARTICLE SALES DATA PROCESSING APPARATUS

(75) Inventor: Katsumi Fujimoto, Numazu (JP)

(73) Assignee: Toshiba Tec Kabushiki Kaisha (JP)

( * ) Notice: Subject to any disclaimer, the term of this patent is extended or adjusted under 35 U.S.C. 154(b) by 1174 days.

(21) Appl. No.: 11/194,140

(22) Filed: Jul. 29, 2005

(65) Prior Publication Data

US 2006/0026074 A1    Feb. 2, 2006

(30) Foreign Application Priority Data

Jul. 30, 2004    (JP)    ............................. 2004-223834

(51) Int. Cl.
  G07G 1/12    (2006.01)
  G06Q 20/00    (2006.01)
(52) U.S. Cl. .......................................... 705/24; 705/16
(58) Field of Classification Search ................... 705/16, 705/24
  See application file for complete search history.

(56) References Cited

U.S. PATENT DOCUMENTS

| 2002/0023005 A1* | 2/2002 | Tanaka et al. ................ 705/22 |
| 2002/0062249 A1 | 5/2002 | Iannacci |
| 2003/0162156 A1* | 8/2003 | Poreh ........................ 434/236 |
| 2003/0191709 A1 | 10/2003 | Elston et al. |
| 2004/0064373 A1* | 4/2004 | Shannon ...................... 705/24 |
| 2004/0133474 A1 | 7/2004 | Tami et al. |

FOREIGN PATENT DOCUMENTS

| JP | 07-249177 | 9/1995 |
| JP | 2000-194949 | 7/2000 |
| JP | 2000194949 | * 7/2000 |
| JP | 2003-132434 | * 5/2003 |
| JP | 2004-206372 | 7/2004 |

OTHER PUBLICATIONS

Communication (w/translation) from Japanese Patent Office re: related application.
Communication from European Patent Office re: related application.

* cited by examiner

*Primary Examiner*—F. Ryan Zeender
*Assistant Examiner*—Fahd A Obeid
(74) *Attorney, Agent, or Firm*—Harness, Dickey & Pierce, P.L.C.

(57) ABSTRACT

Data of a preset separation mark is inserted between journal data of one transaction held in an electronic journal file and journal data of one transaction next made. Journal data items which are accumulatively held in the electronic journal file are displayed on a display unit. Data of a separation marks inserted before and after journal data specified among the journal data items displayed on the display unit are searched for. Journal data lying between the searched separation marks is extracted from the electronic journal file.

7 Claims, 7 Drawing Sheets

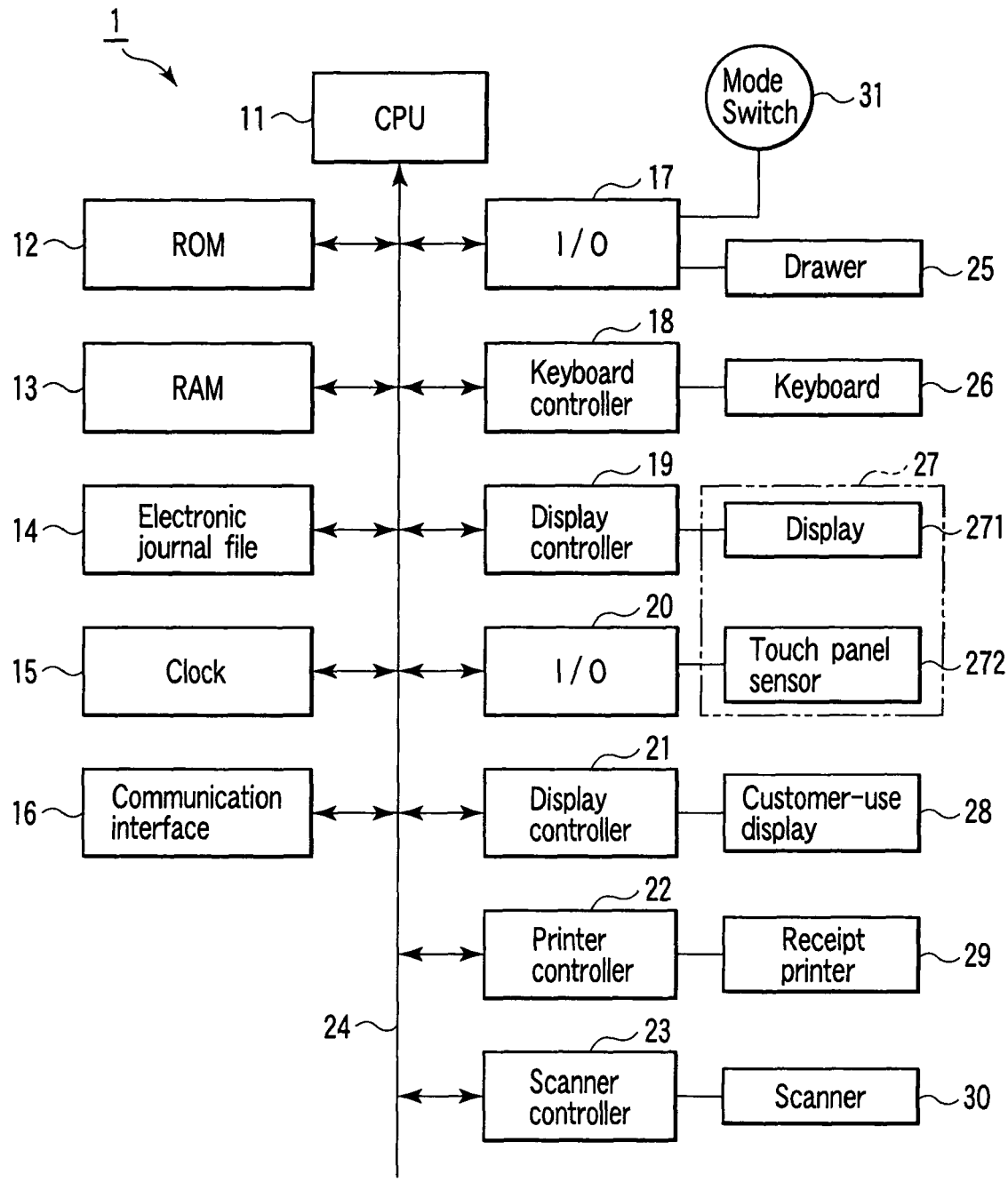
F I G. 1

| RNo | Journal data | DP |
|---|---|---|
| 1 | 11:59, June 24 (Thursday), 2004　　　　　No.0002 | 0 |
| 2 | Station open date entry OK June 24 (Thursday), 2004 | 0 |
| 3 | Transaction No.0004　　　　　　　　　　00001 | 0 |
| 4 | (Separation mark data) | 0 |
| 5 | 11:59, June 24 (Thursday), 2004　　　　　No.0002 | 0 |
| 6 | 00000002:○○ | 0 |
| 7 | Sign-on | 0 |
| 8 | Transaction No.0005　　　　　　　　　　0001 | 0 |
| 9 | (Separation mark data) | 0 |
| 10 | 11:59, June 24 (Thursday), 2004　　　　　No.0002 | 0 |
| 11 | 00000002:○○ | 0 |
| 12 | Department 1 | 0 |
| 13 | 000001　　　Tax included　　　　　¥100 | 0 |
| 14 | Subtotal　　　　　　　　　　　　　¥100 | 0 |
| 15 | Tax included (object　　100:4) | 0 |
| 16 | Total amount　　　　　　　　　　　¥100 | 0 |
| 17 | Finalize by cash　　　　　　　　　¥100 | 0 |
| 18 | Transaction No.0006　　　　　　　　　　00001 | 0 |
| 19 | (Separation mark data) | 0 |
| 20 | 12:01, June 24 (Thursday), 2004　　　　　No.0002 | 0 |

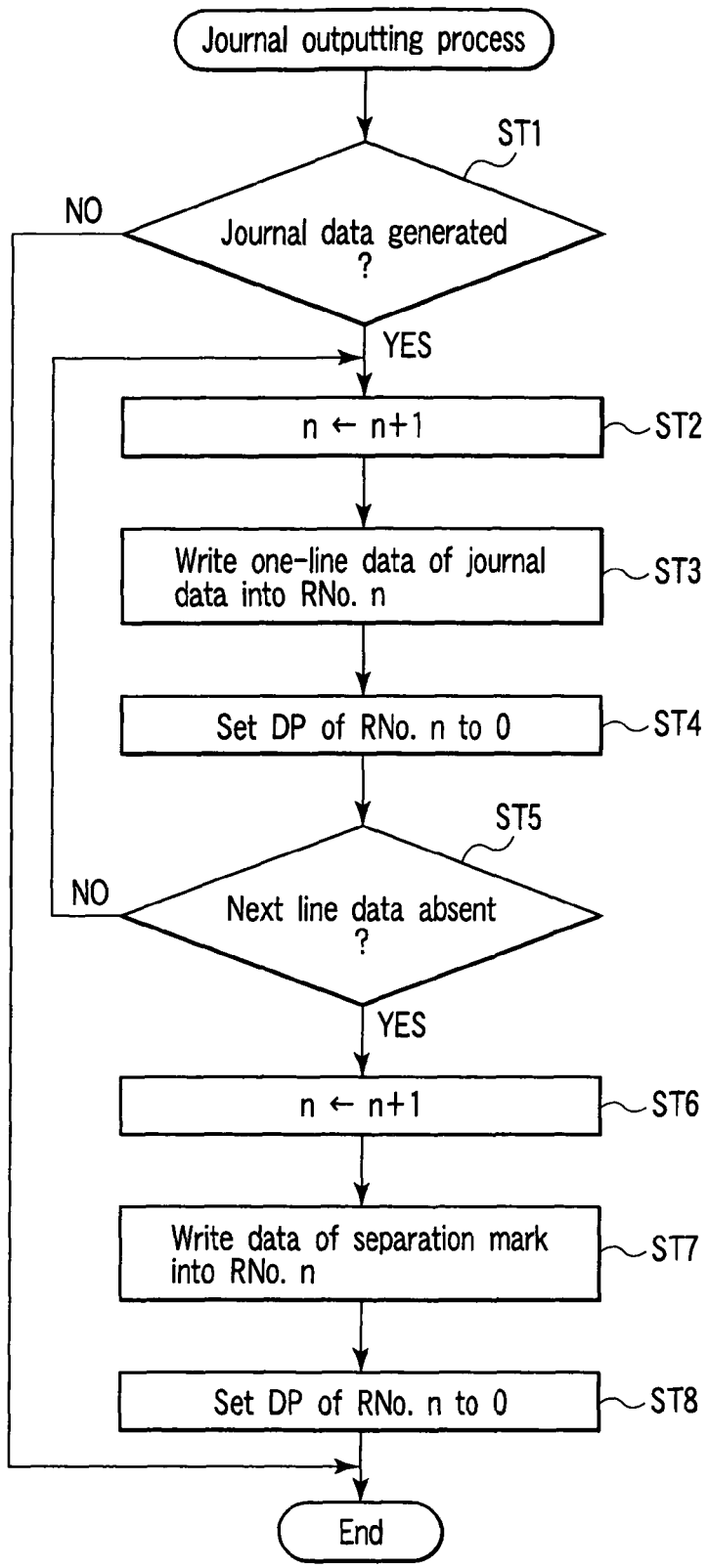
F I G. 3

ARTICLE SALES DATA PROCESSING APPARATUS

CROSS-REFERENCE TO RELATED APPLICATIONS

This application is based upon and claims the benefit of priority from prior Japanese Patent Application No. 2004-223834, filed Jul. 30, 2004, the entire contents of which are incorporated herein by reference.

BACKGROUND OF THE INVENTION

1. Field of the Invention

This invention relates to an article sales data processing apparatus such as a point-of-sales (POS) terminal having a storage section which stores journal data.

2. Description of the Related Art

Recently, an article sales data processing apparatus which holds journal data in an electronic data form by use of a hard disk drive (HDD) device is provided. The storage section which holds the electronic-form journal data is called an electronic journal file.

The article sales data processing apparatus having an electronic journal file can display journal data held in the electronic journal file on a display unit. The user can confirm the history of transactions by displaying journal data on the display unit.

Further, it can print journal data held in the electronic journal file on a sheet of receipt paper. The user can reissue a receipt by printing the journal data on the receipt paper.

In this case, however, it takes time and effort to search for desired journal data among all of the journal data items held in the electronic journal file.

The article sales data processing apparatus described in Jpn. Pat. Appln. KOKAI Publication No. 2003-132434 inputs transaction specifying information such as a transaction number and transaction time as a searching condition. Then, the electronic journal file is searched and journal data specified by the transaction specifying information is extracted and displayed or printed.

However, transaction specifying information such as a transaction number and transaction time is described only on a receipt issued in the transaction. Therefore, if the receipt is lost or the receipt is stained so that characters cannot be read, it takes a long time to extract desired journal data.

Therefore, it is required to provide an article sales data processing apparatus which can easily extract desired journal data even if the searching condition such as the transaction specifying information is not input.

BRIEF SUMMARY OF THE INVENTION

An article sales data processing apparatus according to an aspect of this invention comprises a display unit which displays article sales data, an output section which outputs specification data of a commercial transaction containing article sales data, a storage section which sequentially stores journal data of one transaction corresponding to the specification data of the commercial transaction in an order of transactions made, a separation data inserting section which inserts separation data between journal data of one transaction stored in the storage section and journal data of a transaction next made, a display control section which displays the journal data items stored in the storage section on the display unit, a recognizing unit which recognizes that at least one journal data among the journal data items displayed on the display unit is specified, a searching unit which searches the storage section for the separation data items inserted before and after the journal data which is recognized to be specified by the recognizing unit, and an extracting section which extracts journal data lying between the separation data items searched for by the searching unit from the storage section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and comprise a part of the specification, illustrate embodiments of the invention, and together with the general description given above and the detailed description of the embodiments given below, serve to explain the principles of the invention.

FIG. 1 is a block diagram showing the configuration of the main portions of a POS terminal according to one embodiment of this invention;

FIG. 2 is a configuration diagram of data items held in an electronic journal file of the POS terminal in the above embodiment;

FIG. 3 is a flowchart for illustrating the main processing procedure of a journal outputting process performed by a CPU of the POS terminal in the above embodiment;

DETAILED DESCRIPTION OF THE INVENTION

Figure 4:
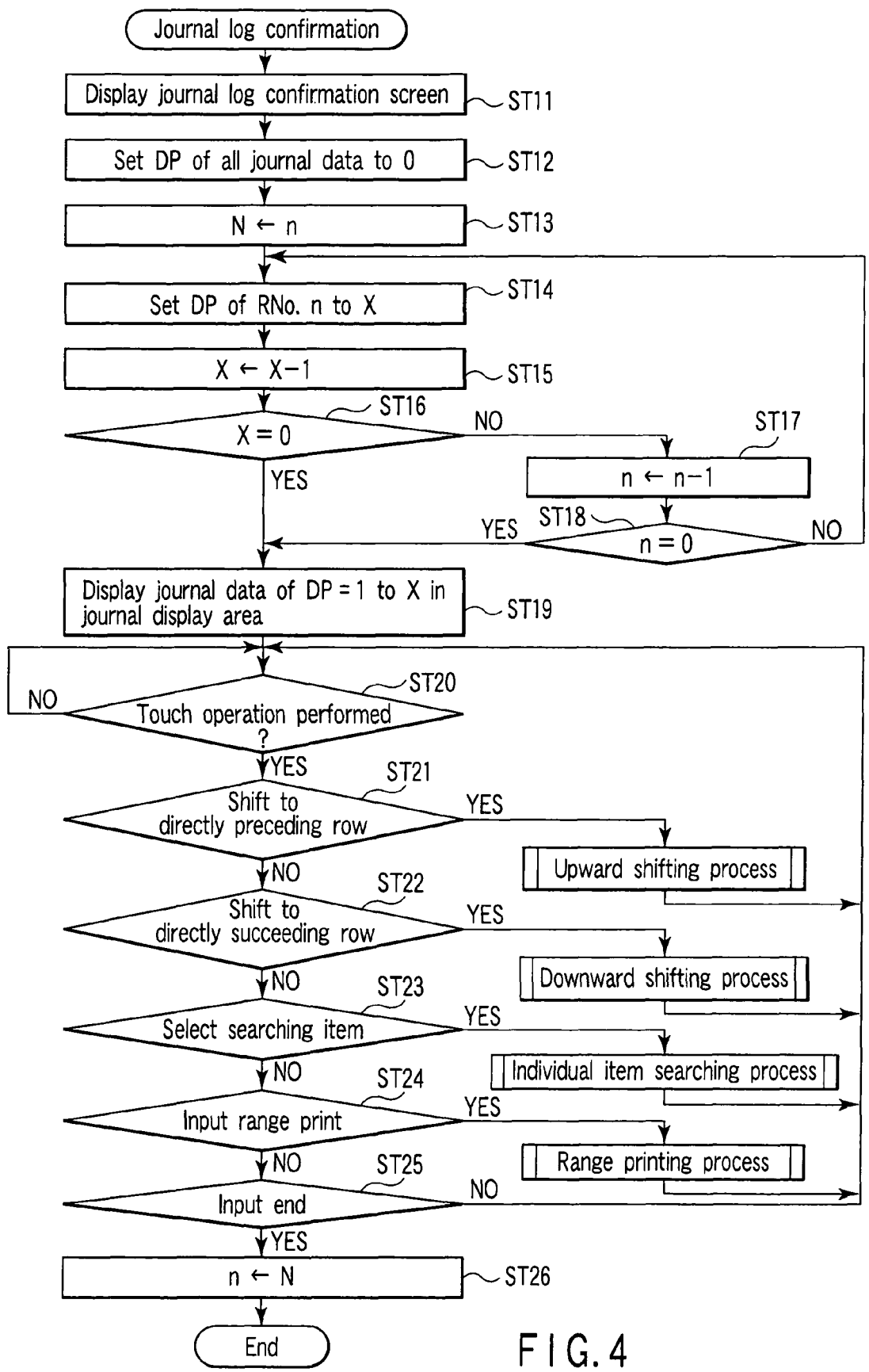
FIG. 4 is a flowchart for illustrating the main processing procedure of a journal log confirmation process performed by the CPU of the POS terminal in the above embodiment.

There will now be described an embodiment of this invention with reference to the accompanying drawings.

FIG. 1 is a block diagram showing a POS terminal 1. The control section of the POS terminal 1 includes a CPU 11, ROM 12, RAM 13, electronic journal file 14 configured by a hard disk drive (HDD) unit, clock 15, communication interface 16, I/O port 17, keyboard controller 18, display controller 19, I/O port 20, display controller 21, printer controller 22, scanner controller 23 and the like. The above units are connected to one another via a bus line 24.

The communication interface 16 is connected to a host computer via a communication line such as a LAN.

The I/O port 17 is connected to a drawer 25 and mode switch 31. In this embodiment, a journal confirmation mode which is set to determine journal data held in the electronic journal file 14 can be selected by use of the mode switch 31.

The keyboard controller 18 is connected to a keyboard 26. The scanner controller 23 is connected to a scanner 30 which is used to read a barcode. An input section which inputs data associated with a commercial transaction is configured by the keyboard 26 and scanner 30. The POS terminal 1 processes article sales data based on data associated with a commercial transaction input via the input section.

The display controller 19 is connected to a display 271. The I/O port 20 is connected to a touch panel sensor 272. A touch panel 27 is configured by the display 271 and touch panel sensor 272. The touch panel 27 is used as a display unit which displays article sales data and the like for the operator.

The display controller 21 is connected to a customer-use display unit 28. Article sales data items and the like are displayed on the customer-use display unit 28 for the customer.

The printer controller 22 is connected to a receipt printer 29 which prints specification data of a commercial transaction containing article sales data on a roll of receipt paper. The receipt paper on which the specification data is printed is cut apart for each commercial transaction and issued as a purchase receipt.

Further, the receipt printer 29 prints data not only on the purchase receipt but also on a station open date entry receipt issued at the station open date entry time, a sign-on receipt issued at the sign-on time or the like. On the station open date entry receipt, the date and time, operator code and the like are printed. Further, on the sign-on receipt, the date and time, operator code and the like are printed.

Printing data items of the receipts printed by the receipt printer 29 are sequentially stored in the electronic journal file 14 as journal data in the order of generation.

The configuration example of journal data held in the electronic journal file 14 is shown in FIG. 2. The journal data is held by treating printing data of one row of the receipt paper as one record. Further, separation mark data is held as one record. A record number RNo and display pointer DP are attached to each record. The record numbers RNo are consecutive numbers which are sequentially increased by "1" for each data.

The separation mark data is inserted between the journal data of one sheet of a receipt and journal data of one sheet of a receipt next issued.

FIG. 3 is a flowchart for illustrating the procedure of a journal outputting process which the CPU 11 performs. When a receipt such as a station open date entry receipt, sign-on receipt or purchase receipt is printed, journal data corresponding to printing data of the receipt is generated.

In step ST1, the CPU 11 determines whether journal data is generated or not. If journal data is generated, the CPU 11 counts up the count value n of a record number counter by "1" in step ST2.

Then, in step ST3, the CPU 11 extracts one-line data printed on the first row of the receipt among the generated journal data and writes the one-line data into the electronic journal file 14 as a record of the record number RNo. n. Further, in step ST4, the display pointer DP of the record is set to "0". In this case, "n" of the record number RNo. n indicates the count value n of the record number counter.

In step ST5, the CPU 11 determines whether next one-line data is absent in the generated journal data or not. When next one-line data is present, the CPU 11 performs a process of steps ST2 to ST4 again. That is, the CPU 11 counts up the count value n of the record number counter. Then, the CPU 11 writes next one-line data into the electronic journal file 14 as a record of the record number RNo. n. Further, the display pointer DP of the record is set to "0".

The CPU 11 repeatedly performs the process of steps ST2 to ST4 until one-line data printed on the last row of the receipt is written into the electronic journal file 14. As a result, the generated journal data items are written into the electronic journal file 14 in ascending order of the record numbers RNo. n.

If it is determined in step ST5 that next one-line data is absent in the generated journal data, the CPU 11 further counts up the count value n of the record number counter by "1" in step ST6. Then, in step ST7, the CPU 11 writes preset separation mark data into the electronic journal file 14 as a record of the record number RNo. n. Further, the CPU 11 sets the display pointer DP of the record to "0" in step ST8.

Thus, the CPU 11 terminates the journal outputting process for the journal data generated at this time.

For example, the separation mark may be ruled line data such as broken lines, one-dot-dash line and solid line. Further, the separation mark may be desired code data configured by a character string, symbols or the like.

FIG. 4 is a flowchart for illustrating the procedure of a journal log confirmation process which the CPU 11 performs. When the mode switch 31 is operated to select a journal log confirmation mode, the CPU 11 starts the journal log confirmation process.

First, the CPU 11 displays a journal log confirmation screen 40 on a display 201 of the touch panel 20 in step ST11.

Figure 8:
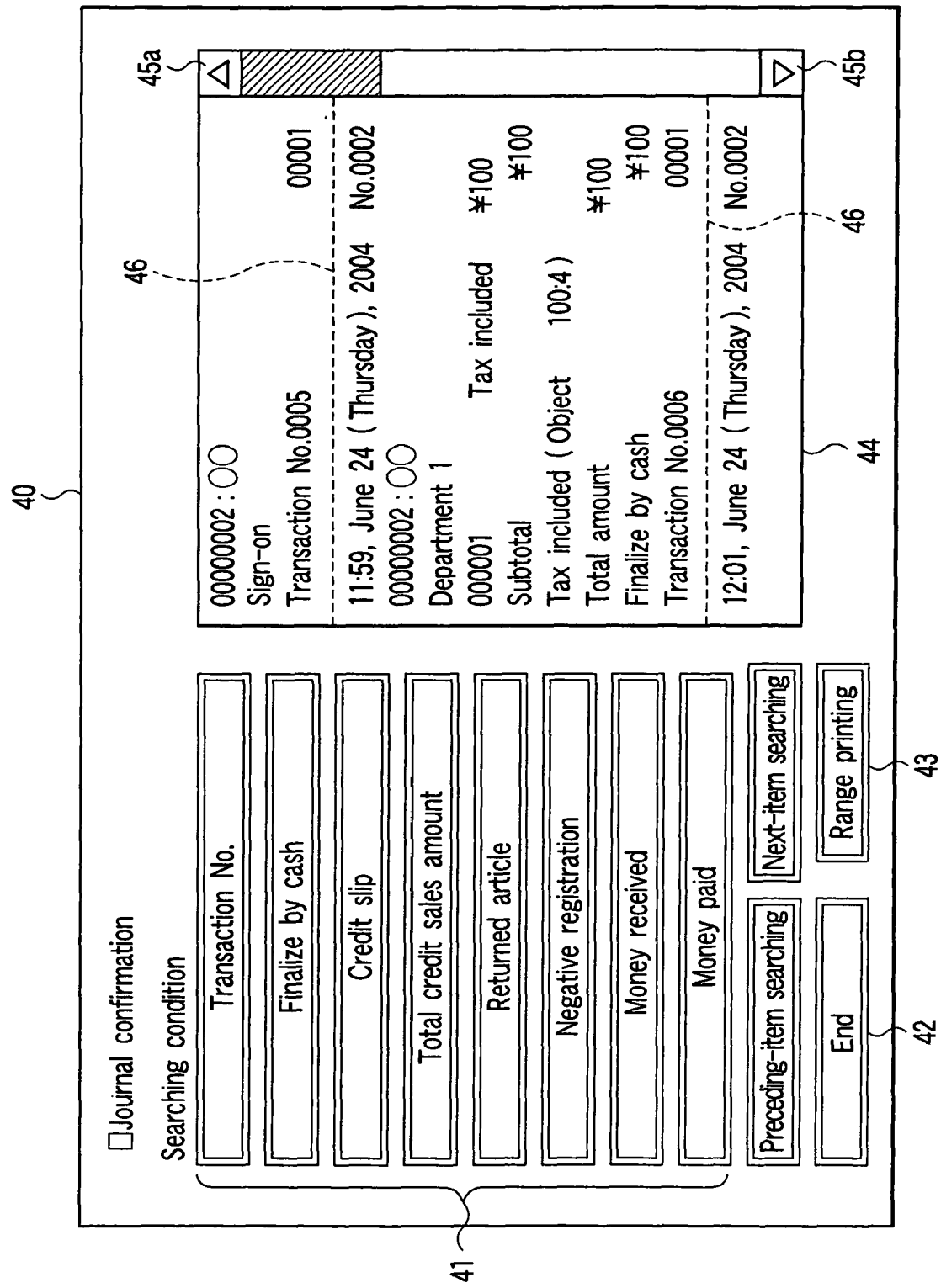
FIG. 8 is a view showing one example of the journal log confirmation screen displayed on the display unit.

One example of the journal log confirmation screen 40 is shown in FIG. 8. On the journal log confirmation screen 40, a plurality of searching condition selection buttons 41, end button 42, range printing button 43 and the like are displayed. Condition items used to search for journal data are allocated to the respective searching condition selection buttons 41. The searching conditions correspond to a transaction number, finalize by cash, credit slip, total credit sales amount, returned articles, negative registration, receipt of money, payment and the like.

A journal display area 44 is formed on the journal log confirmation screen 40. In the journal display area 44, journal data held in the electronic journal file 14 can be displayed over a plurality of rows.

In the journal display area 44, a scroll bar 45 is displayed. By operating the scroll bar 45, journal data in the journal display area 44 is scrolled up or down.

The journal log confirmation screen 40 shown in FIG. 8 is only one example. The layout of the screen is not particularly limited. The journal log confirmation screen 40 is only required to have at least the journal display area 44.

After the journal log confirmation screen 40 is displayed, the CPU 11 checks the display pointer DP of each record stored in the electronic journal file 14 in step ST12. Then, the CPU 11 sets all of the display pointers DP other than "0" to "0".

The CPU 11 copies the count value n of the record number counter into a temporary saving memory N of the RAM 13 in step ST13.

The CPU 11 sets the display pointer DP of the record having the record number RNo. n among the records stored in the electronic journal file 14 to "X" in step ST14. In this case, "n" of the record number RNo. n indicates the count value n of the record number counter. Further, "X" indicates the number of rows of journal data which can be displayed in the journal display area 44. The value "X" is previously stored as the initial value of a row number counter.

The CPU 11 counts down the count value X of the row number counter by "1" in step ST15. Then, in step ST16, the CPU 11 determines whether the count value X has reached "0" or not.

When the count value X is larger than "0", the CPU 11 counts down the count value n of the record number counter by "1" in step ST17. Then, in step ST18, the CPU 11 determines whether the count value n has reached "0" or not.

When the count value n is larger than "0", the process is returned to step ST14. That is, the CPU 11 sets the display pointer DP of the record having the record number RNo. n among the records stored in the electronic journal file 14 to "X". Further, it counts down the count value X of the row number counter by "1".

The CPU 11 repeatedly performs the process of steps ST14 and ST15 until the count value X of the row number counter becomes "0" or the count value n of the record number counter becomes "0".

When the count value X or n becomes "0", the CPU 11 simultaneously reads out data of each of the records in which the display pointers DP are set to "1" to "X", that is, one-line data of the journal data in step ST19. Then, data items from the one-line-data corresponding to the display pointer DP of "1" to the one-line data corresponding to the display pointer DP of "X" are sequentially displayed in the journal display area 44 from the top thereof.

After the journal data items of X rows are displayed in the journal display area 44, the CPU 11 waits in step ST20 until the screen of the display 201 is touch-operated. The CPU 11 determines that the screen is touch-operated when a signal is input from the touch panel sensor 202.

In step ST21, the CPU 11 performs an upward shifting process when it determines that the operation of instructing the process of shifting to the directly preceding row in the journal display area 44 is performed. The upward shifting process is explained later in detail.

In step ST22, the CPU 11 performs a downward shifting process when it determines that the operation of instructing the process of shifting to the directly succeeding row in the journal display area 44 is performed. The downward shifting process is explained later in detail.

In step ST23, the CPU 11 performs an individual item searching process when it determines that one of the searching condition selecting buttons 41 is touch-operated. After this, the CPU 11 determines the searching condition allocated to the touch-operated button 41. Then, the CPU 11 extracts journal data corresponding to the searching condition from the electronic journal file 14 and displays the same in the journal display area 44.

In step ST24, the CPU 11 performs a range printing process when it determines that the range printing button 43 is touch-operated. The detail explanation for the range printing process is made later.

After the upward shifting process, downward shifting process, individual item searching process or range printing process is performed, the CPU 11 returns the process to step ST20. The CPU 11 waits until the next touch operation is performed.

In step ST26, the CPU 11 returns the count value n which has been saved in the temporary saving memory N to the record number counter when it detects that the end button 42 is touch-operated in step ST25. Thus, the CPU 11 terminates the journal log confirmation process.

Figure 5:
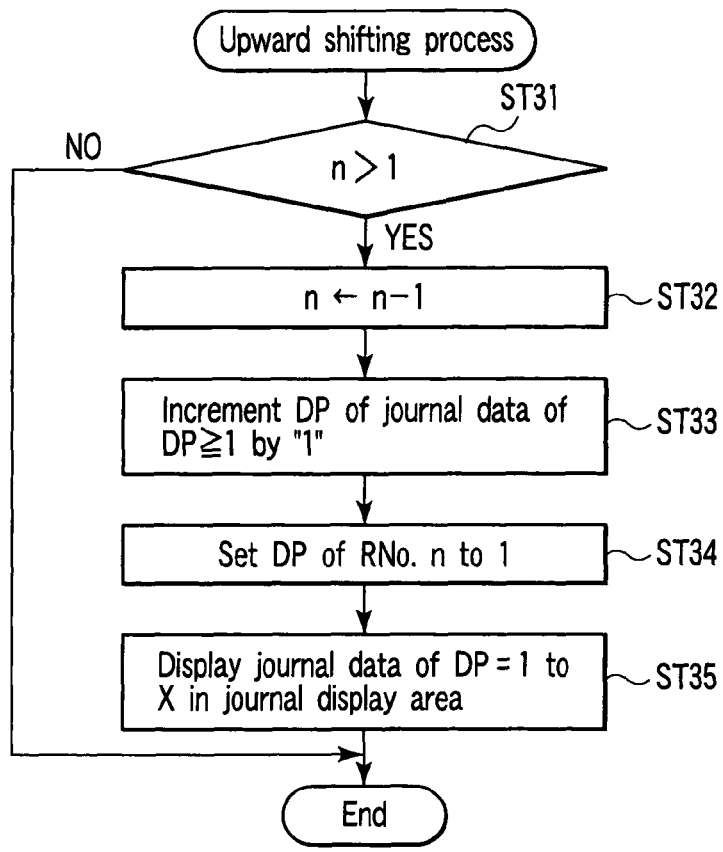
FIG. 5 is a flowchart for illustrating the detail procedure of an upward shifting process during the journal log confirmation process.

FIG. 5 is a flowchart for specifically illustrating the procedure of the upward shifting process. The CPU 11 determines that the process of shifting to the directly preceding row is instructed when it detects that the upward mark 45a of the scroll bar 45 is touch-operated or the uppermost row of the journal display area 44 is touch-operated. Then, the CPU 11 starts the upward shifting process.

In step ST31, the CPU 11 determines whether or not the count value n of the record number counter is larger than "1". When the count value n is not larger than "1", it is impossible to perform the upward shifting process, and therefore, the CPU 11 terminates the upward shifting process.

When the count value n is larger than "1", the CPU 11 counts down the record number counter by "1" in step ST32. Then, in step ST33, the CPU 11 increments by "1" the display pointers DP of the records in which the display pointers DP are set to "1" or more among the records in the electronic journal file 14.

In step ST34, the CPU 11 sets the display pointer DP of the record of the record number RNo. n to "1". In this case, "n" of the record number RNo. n indicates the value n of the record number counter.

Next, in step ST35, the CPU 11 simultaneously reads out data items of the records in which the display pointers DP are set to "1" to "X", that is, one-line data items of the journal data. Then, data items from one-line data corresponding to the display pointer DP of "1" to one-line data corresponding to the display pointer DP of "X" are sequentially displayed in the journal display area 44 from the top thereof. Thus, the CPU 11 terminates the upward shifting process.

Figure 6:
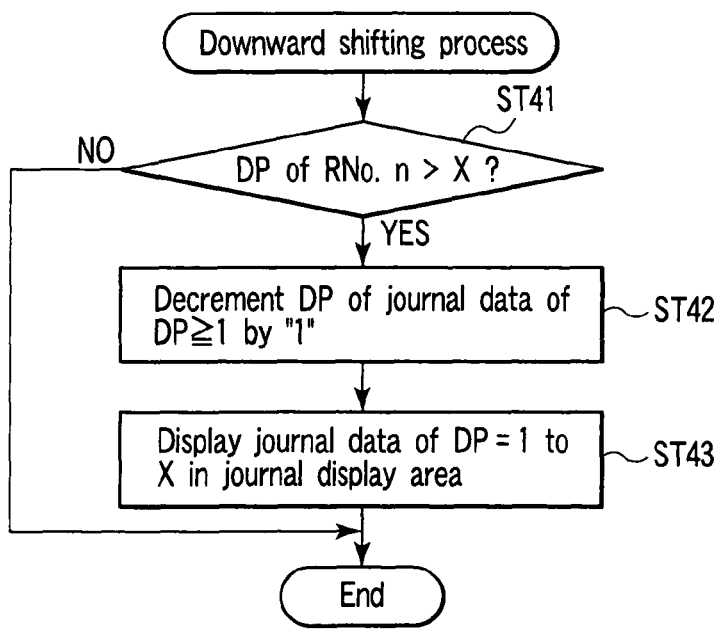
FIG. 6 is a flowchart for illustrating the detail procedure of a downward shifting process during the journal log confirmation process.

FIG. 6 is a flowchart for specifically illustrating the procedure of the downward shifting process. The CPU 11 determines that the process of shifting to the directly succeeding row is instructed when it detects that the downward mark 45b of the scroll bar 45 is touch-operated or the lowest row of the journal display area 44 is touch-operated. Then, the CPU 11 starts the downward shifting process.

In step ST41, the CPU 11 determines whether the display pointer DP of the record corresponding to the record number N is larger than "X" or not. In this case, "N" in the record number N indicates a value saved in the temporary saving memory N. That is, in step ST41, it is determined whether or not the display pointer DP corresponding to the last one-line data among the newest journal data held in the electronic file 14 exceeds the number X of rows which can be displayed in the journal display area 44. When the display pointer DP of the record corresponding to the record number N is not larger than "X", it is impossible to perform the downward shifting process, and therefore, the CPU 11 terminates the downward shifting process.

When the display pointer DP of the record corresponding to the record number N is larger than "X", the CPU 11 decrements by "1" the display pointers DP of the records corresponding to the display pointers DP of "1" or more among the records in the electronic journal file 14 in step ST42.

In step ST43, the CPU 11 simultaneously reads out data items of the records in which the display pointers DP are set to "1" to "X", that is, one-line data items of the journal data. Then, data items from one-line data corresponding to the display pointer DP of "1" to one-line data corresponding to the display pointer DP of "X" are sequentially displayed in the journal display area 44 from the top thereof. Thus, the CPU 11 terminates the downward shifting process.

Figure 7:
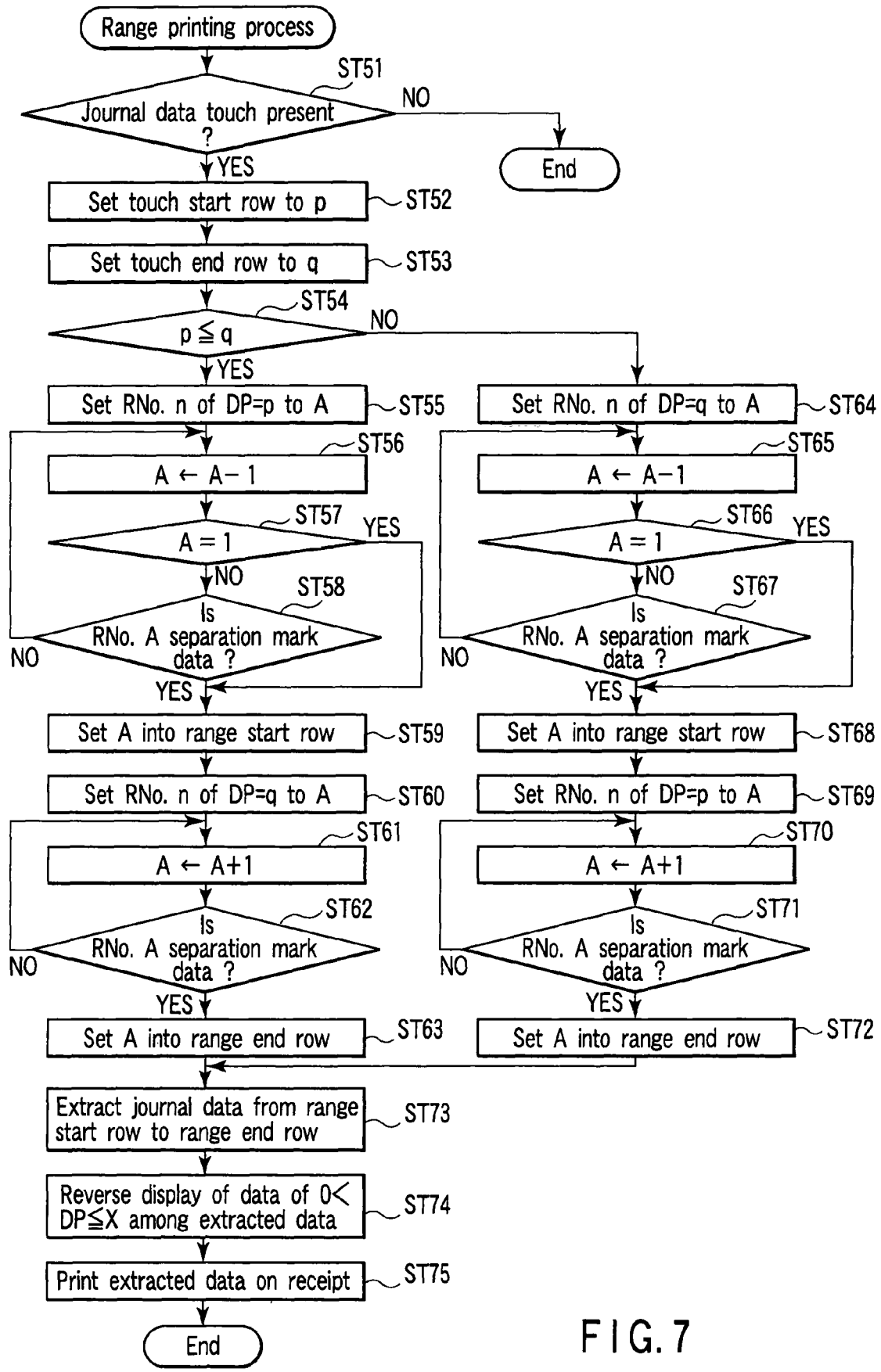
FIG. 7 is a flowchart for illustrating the detail procedure of a range printing process during the journal log confirmation process.

FIG. 7 is a flowchart for specifically illustrating the procedure of the range printing process. The CPU 11 starts the range printing process when it detects that the range printing button 43 is touch-operated.

In step ST51, the CPU 11 determines whether or not the journal display area 44 is touch-operated immediately before the range printing button 43 is touch-operated. If the journal display area 44 is not touch-operated, the CPU 11 determines that the range printing button 43 is erroneously touch-operated and terminates the range printing process.

If the journal display area 44 is touch-operated, the CPU 11 detects a display row p of the journal display area 44 at which the touch operation is started in step ST52. That is, it detects the display row p of the journal display area 44 which the finger of the operator first touches. The CPU 11 stores the display row p into a touch start row memory of the RAM 13.

In step ST53, the CPU 11 detects a display row q of the journal display area 44 at which the touch operation is terminated. That is, it detects the display row q of the journal display area 44 which has been touched immediately before the finger of the operator was separated. The CPU 11 stores the display row q into a touch end row memory of the RAM 13.

In step ST54, the CPU 11 compares the value p in the touch start row memory with the value q in the touch end row memory. As a result, when both values are equal or the value p in the touch start row memory is smaller than the value q in the touch end row memory, the CPU 11 performs the process of steps ST55 to ST63 and the process of steps ST73 to ST75.

In step ST55, the CPU 11 sets the record number of the record in which the display pointer DP indicates the value p of the touch start row memory among the records in the electronic journal file 14 to an initial value A of the searching counter.

In step ST56, the CPU 11 counts down the searching counter by "1". Then, in step ST57, the CPU 11 determines whether or not the count value A of the searching counter has reached "1".

When the count value A of the searching counter has not reached "1", the CPU 11 determines in step ST58 whether data of the record number RNo. A held in the electronic journal file 14 is separation mark data or not. In this case, "A" in the record number RNo. A indicates the count value A of the searching counter.

If data of the record number RNo. A is not a separation mark data, the CPU 11 returns the process to step ST56. The CPU 11 counts down the searching counter by "1". Then, when the count value A of the searching counter is not "1", the CPU 11 determines whether or not data of the record number RNo. A is separation mark data. When data of the record number RNo. A is not a separation mark data, the CPU 11 returns the process to step ST56.

When the count value A of the searching counter is set to "1" or data of the record number RNo. A is the separation mark data, the CPU 11 sets the count value A of the searching counter into the range start row memory of the RAM 13 in step ST59. Data of the range start row memory at this time point is set as "As".

In step ST60, the CPU 11 sets the record number of the record in which the display pointer DP indicates the value q of the touch end row memory among the records in the electronic journal file 14 to an initial value A of the searching counter.

In step ST61, the CPU 11 counts up the searching counter by "1". Then, in step ST62, the CPU 11 determines whether or not data of the record number RNo. A held in the electronic journal file 14 is separation mark data. In this case, "A" in the record number RNo. A indicates the count value A of the searching counter.

When data of the record number RNo. A is not a separation mark data, the CPU 11 returns the process to step ST61. The CPU 11 further counts up the searching counter by "1". Then, the CPU 11 determines whether or not data of the record number RNo. A is separation mark data. If data of the record number RNo. A is not a separation mark data, the CPU 11 returns the process to step ST61.

If data of the record number RNo. A is a separation mark data, the CPU 11 sets the count value A of the searching counter into the range end row memory of the RAM 13 in step ST63. Data of the range end row memory at this time point is set as "Ap".

The CPU 11 extracts records ranging from the record of the record number RNo. As to the record of the record number RNo. Ap among the records held in the electronic journal file 14 in step ST73. In this case, "As" of the record number RNo. As is a storage value As of the range start row memory. Further, "Ap" of the record number RNo. Ap is a storage value Ap of the range end row memory.

In step ST74, the CPU 11 simultaneously reads out data items of the records in which the display pointers DP are set larger than "1" and not larger than "X", that is, one-line data items of the journal data. Then, data items from one-line data corresponding to the display pointer DP of "1" to one-line data corresponding to the display pointer DP of "X" are sequentially displayed in the journal display area 44 from the top thereof. At this time, the CPU 11 displays the data items of the records ranging from the record of the record number RNo. As to the record of the record number RNo. Ap among the data items displayed in the journal display area 44 in a black-and-white reverse display form in the journal display area 44.

In step ST75, the CPU 11 sets data items of the records ranging from the record of the record number RNo. As to the record of the record number RNo. Ap among the records held in the electronic journal file 14, that is, one-line data items of the journal data extracted in the process of step ST73 into the print buffer of the RAM 13 in the order of decreasing recording number. Then, the CPU 11 starts the printing process to print the contents of the print buffer on a roll of receipt paper and output the same by use of the receipt printer 22. Thus, the CPU 11 terminates the range printing process.

If it is determined in step ST54 that the value p in the touch start row memory is larger than the value q in the touch end row memory, the CPU 11 performs the process of steps ST64 to ST75.

In step ST64, the CPU 11 sets the record number of the record in which the display pointer DP is the value q of the touch end row memory among the records in the electronic journal file 14 to an initial value A of the searching counter.

The CPU 11 counts down the searching counter A by "1" in step ST65. Then, in step ST66, the CPU 11 determines whether or not the count value A of the searching counter has reached "1".

When the count value A of the searching counter is not "1", the CPU 11 determines in step ST67 whether or not data of the record number RNo. A held in the electronic journal file 14 is separation mark data. In this case, "A" in the record number RNo. A indicates a count value A of the searching counter.

If data of the record number RNo. A is not a separation mark data, the CPU 11 returns the process to step ST65. Then, the CPU 11 further counts up the searching counter by "1". After this, if the count value A of the searching counter is not "1", it determines whether data of the record number RNo. A is separation mark data or not. If data of the record number RNo. A is not a separation mark data, the CPU 11 returns the process to step ST65.

If the count value A of the searching counter becomes "1" or data of the record number RNo. A is a separation mark data, the CPU 11 sets the count value A of the searching counter into the range start row memory of the RAM 13 in step ST68. Data of the range start row memory at this time point is set as "As".

In step ST69, the CPU 11 sets the record number of the record in which the display pointer DP indicates the value p of the touch start row memory among the records in the electronic journal file 14 to an initial value A of the searching counter.

The CPU 11 counts up the searching counter by "1" in step ST70. Then, it determines in step ST71 whether or not data of the record number RNo. A held in the electronic journal file 14 is separation mark data. In this case, "A" in the record number RNo. A indicates a count value A of the searching counter.

If data of the record number RNo. A is not a separation mark data, the CPU 11 returns the process to step ST70. Then, the CPU 11 further counts up the searching counter by "1". After this, it determines whether data of the record number RNo. A is separation mark data or not. If data of the record number RNo. A is not a separation mark data, the CPU 11 returns the process to step ST70.

If data of the record number RNo. A is a separation mark data, the CPU 11 sets the count value A of the searching counter into the range end row memory of the RAM 13 in step ST72. Data of the range end row memory at this time point is set as "Ap".

After this, the CPU 11 performs the process of steps ST73 to ST75. Thus, the CPU 11 terminates the range printing process.

According to the present embodiment with the above configuration, journal data of one unit corresponding to the whole printing data with respect to one sheet of receipt paper is stored into the electronic journal file 14 each time each of various types of receipts is printed by the receipt printer 22. Separation mark data is inserted between journal data of one unit and journal data of one unit which is next issued.

For example, it is possible to confirm the history of the past commercial transactions based on journal data held in the electronic journal file 14. If it becomes necessary to confirm the history of the past commercial transactions, the operator switches the mode switch 31 to select the journal confirmation mode. Then, the journal log confirmation screen 40 is displayed on the display 201 of the operator-use display unit 20.

In the journal display area 44 of the journal log confirmation screen 40, one-line data of X rows counted from the last line data of the newest journal data of one unit is displayed. At this time, if separation mark data is contained in the one-line data of X rows, a separation mark is displayed.

FIG. 8 shows a case wherein the separation mark is expressed by ruled line data of broken lines. A separation mark 46 of broken lines is inserted between the last row of the journal data of one unit and the first row of journal data of one unit which is next generated.

The operator determines whether journal data of the commercial transaction which requires history confirmation is displayed in the journal display area 44 or not. If the data is not displayed, the operation of shifting to the directly preceding row or shifting to the directly succeeding row is repeatedly performed to scroll the journal data and display desired journal data in the journal display area 44.

When journal data of the commercial transaction which requires history confirmation is displayed in the journal display area 44, the operator touch-operates a desired portion of the display area of the journal data with his finger and then touch-operates the range printing button 43.

As a result, the separation mark data items inserted before and after the journal data are searched for and the journal data held between the separation marks data is extracted. The extracted journal data is displayed in a black-and-white reverse display form in the journal display area 44. Further, the journal data is printed on a roll of receipt paper by the receipt printer 22 and output.

Thus, according to the present embodiment, journal data can be extracted by simply touch-operating a desired portion of the display area of the journal data after the desired journal data is displayed in the journal display area 44. Then, it becomes possible to display the extracted journal data in a black-and-white reverse display form or print the journal data on a roll of receipt paper by the receipt printer 22 and output the same.

Since it is not required to input the searching condition such as the transaction number and transaction time, the time and labor for inputting the searching condition can be omitted. Further, since an issued receipt on which the transaction specifying information is recorded becomes unnecessary, it becomes possible to reduce the operation time and alleviate the labor required for the journal data confirming operation.

It is desired to simultaneously confirm a plurality of journal data items in some cases. In such a case, the journal data items can be confirmed by touch-operating the corresponding journal data items one by one as described before and outputting each receipt.

In the present embodiment, a plurality of successive journal data items can simultaneously be extracted by one touch operation, printed together on one receipt and output.

First, the operator displays journal data which is issued at the earliest timing among the journal data items required to be confirmed in the journal display area 44 and touch-operates the same with his finger.

Next, the operator moves his finger downwardly with the finger kept in contact with the screen and continuously touch-operates the last row of the journal display area 44. Thus, journal data items are sequentially shifted downwardly.

If the journal data which is issued at the newest timing among the journal data items required to be confirmed is displayed in the journal display area 44, the operator separates his finger from the screen. Then, he touch-operates the range printing button 43.

Thus, journal data from the separation mark data inserted before the journal data which is issued at the earliest timing to the separation mark data inserted after the journal data which is issued at the newest timing is extracted. Then, the journal data is printed on one receipt. Therefore, a plurality of journal data items required to be confirmed can be printed together on one receipt and output.

Further, the operator displays the journal data which is issued at the newest timing among the journal data items required to be confirmed in the journal display area 44 and touch-operates the data with his finger. Next, he moves his finger upwardly with his finger kept in contact with the screen. Thus, he continuously touch-operates the first row of the journal display area 44 so as to shift the journal data items upwardly.

The operator separates his finger from the screen when the journal data which is issued at the earliest timing among the journal data items required to be confirmed is displayed in the journal display area 44. By thus performing the operation, it is of course possible to attain the same result as described before.

The invention is not limited to the above embodiment itself and can be variously modified and embodied without departing from the technical scope thereof at the embodying stage.

For example, a desired key of the keyboard 19 can be used instead of the end button 42 or range printing button 43. Then, the touch panel sensor 202 is not required to be provided on the entire screen of the display 201 and may be provided only in the journal display area 44.

Further, a pointing device such as a mouse may be connected instead of the touch panel sensor 202. Thus, journal data displayed in the journal display area 44 can be specified by operating the pointing device.

In the present embodiment, the separation mark is displayed in the journal display area 44, but it is not always necessary to display the separation mark. The separation mark may be omitted and only journal data can be displayed.

Further, in the present embodiment, the journal log confirmation mode is selected by operating the mode switch 31. However, the mode selecting method is not limited to the above method and can be attained by selecting the mode by a key operation or selecting the mode from the menu screen.

In the present embodiment, the extracted journal data is printed on a roll of receipt paper and output by use of the receipt printer 22. However, it is also possible to display and output specification data corresponding to the extracted journal data on the display 271 in order to utilize the journal data for the article returning process or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An article sales data processing apparatus which processes article sales data based on data associated with a commercial transaction input via an input section, comprising:
    a display unit which displays the article sales data,
    an output section which outputs specification data of commercial transactions containing the article sales data,
    a storage section which electronically stores journal data items of respective transactions in a computer medium, the journal data items each corresponding to the specification data of one of the commercial transactions in an order in accordance with a respective time at which each of the transactions is made,
    a separation data inserting section which inserts an electronic separation data item in the computer medium between the stored journal data items of the transactions consecutively made,
    a display controller which displays, on the display unit, each of the journal data items stored in the storage section,
    a scroll processor which scrolls the journal data items displayed on the display unit,
    a touch panel sensor which is provided in an area, of the display unit, in which at least the journal data items are displayed and scrolled,
    a recognizing unit which recognizes that at least one of the journal data items displayed in a touch-operated area is specified from the journal data items displayed and scrolled on the display unit,
    a searching unit which searches the storage section for the separation data items inserted before and after the journal data item which is recognized to have been specified by the recognizing unit,
    an extracting section which extracts the journal data items between the separation data items searched for by the searching unit from the storage section, and
    a display switching section which displays, on the display unit, the journal data item extracted by the extracting section, separately from the journal data items which are not extracted.

2. The article sales data processing apparatus according to claim 1, in which the output section is a receipt printer used to print data on a roll of receipt paper and which further comprises a print controller which causes the receipt printer to print the journal data items extracted by the extracting section on a roll of receipt paper.

3. The article sales data processing apparatus according to claim 1, wherein the searching unit searches for the separation data item inserted before the journal data item whose transaction order is the oldest and the separation data item inserted after the journal data item whose transaction order is the newest when the recognizing unit recognizes that a plurality of the journal data items are specified.

4. The article sales data processing apparatus according to claim 1, wherein the recognizing unit recognizes time when a finger touches the display unit and time when the finger is separated from the display unit based on a signal of the touch panel sensor, and
    wherein the recognizing unit recognizes that data lying from the journal data item displayed in a position which the finger touches to the journal data item displayed in a position from which the finger is separated is specified.

5. The article sales data processing apparatus according to claim 1, wherein the recognizing unit recognizes, when a finger touches the display unit, a touch start row which is a row of the journal data item displayed in a position touched by the finger, and recognizes, when the finger is separated from the display unit, a touch end row which is a row of the journal data item displayed in a position at which the finger is separated.

6. The article sales data processing apparatus according to claim 5, wherein the searching unit compares the touch start row with the touch end row,
    if the touch start row is smaller than the touch end row, the searching unit searches for the separation data item inserted before the journal data item displayed in the touch start row to store a record number of this separation data item in a range start row memory, and searches for the separation data item inserted after the journal data item displayed in the touch end row to store a record number of this separation data item in a range end row memory, and
    if the touch start row is larger than the touch end row, the searching unit searches for the separation data item inserted before the journal data item displayed in the touch end row to store a record number of this separation data item in the range start row memory, and searches for the separation data item inserted after the journal data item displayed in the touch start row to store a record number of this separation data item in the range end row memory.

7. The article sales data processing apparatus according to claim 6, wherein the extracting section extracts the journal data items between the separation data item of the record number stored in the range start row memory and the separation data item of the record number stored in the range end row memory.

* * * * *